US010666823B2

(12) United States Patent
Lo et al.

(10) Patent No.: US 10,666,823 B2
(45) Date of Patent: May 26, 2020

(54) MODULAR DASHBOARD OF A PRINTING DEVICE WITH CUT-OUTS FOR USER CONTROLS

(71) Applicant: Hewlett-Packard Development Company, L.P., Houston, TX (US)

(72) Inventors: Kevin Lo, Vancouver, WA (US); Duane A Koehler, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/093,427

(22) PCT Filed: Jul. 1, 2016

(86) PCT No.: PCT/US2016/040693
§ 371 (c)(1),
(2) Date: Oct. 12, 2018

(87) PCT Pub. No.: WO2018/004657
PCT Pub. Date: Jan. 4, 2018

(65) Prior Publication Data
US 2019/0124221 A1 Apr. 25, 2019

(51) Int. Cl.
*H04N 1/00* (2006.01)
*B41J 29/00* (2006.01)
(Continued)

(52) U.S. Cl.
CPC ............ *H04N 1/00538* (2013.01); *B41J 3/46* (2013.01); *B41J 29/00* (2013.01); *B41J 29/02* (2013.01); *B41J 29/13* (2013.01); *H04N 1/00342* (2013.01); *H04N 1/00384* (2013.01); *H04N 1/00392* (2013.01); *H04N 1/00411* (2013.01);
(Continued)

(58) Field of Classification Search
CPC ........... H04N 1/00538; H04N 1/00557; H04N 1/00342; H04N 1/00384; H04N 1/00392; H04N 1/00411; B41J 29/00
See application file for complete search history.

(56) References Cited

U.S. PATENT DOCUMENTS 5,283,862 A * 2/1994 Lund ...................... G06F 1/162
345/173
5,493,365 A 2/1996 Matsui et al.
(Continued)

FOREIGN PATENT DOCUMENTS

CN 102375391 3/2012
CN 105189125 12/2015
(Continued)

OTHER PUBLICATIONS

Webpage retrieved Mar. 31, 2016. HP Support Center. HP LaserJet—Install the HP Multi-Protocol Proximity Card Reader CZ208A ~ 5 pages.

*Primary Examiner* — Iriana Cruz
(74) *Attorney, Agent, or Firm* — Fabian VanCott

(57) ABSTRACT

A modular dashboard for a printing device includes: a board; a cut-out in the board to accommodate user controls; a lateral portion of the board that is lateral to the cut-out to cover a pocket in the printing device for containing a device adding functionality to the printing device; and a fastener for removably attaching the board to the printing device.

20 Claims, 9 Drawing Sheets

(51) Int. Cl.

| | |
|---|---|
| ***B41J 3/46*** | (2006.01) |
| ***B41J 29/13*** | (2006.01) |
| ***B41J 29/02*** | (2006.01) |

(52) U.S. Cl.

CPC ..... *H04N 1/00496* (2013.01); *H04N 1/00503* (2013.01); *H04N 1/00557* (2013.01); *H04N 2201/0094* (2013.01)

(56) References Cited

U.S. PATENT DOCUMENTS

| | | | | |
|---|---|---|---|---|
| 5,657,066 | A | 8/1997 | Adams et al. | |
| 5,706,030 | A * | 1/1998 | Ishigami | B41J 3/4075 345/168 |
| 6,366,747 | B1 | 4/2002 | Roller | |
| 2006/0226745 | A1 | 10/2006 | Kimura | |
| 2008/0048998 | A1 * | 2/2008 | Yamauchi | G03G 15/5016 345/204 |
| 2009/0086248 | A1 * | 4/2009 | Motoyama | H04N 1/00002 358/1.13 |
| 2013/0083338 | A1 | 4/2013 | Fahrenkrug et al. | |
| 2014/0362403 | A1 * | 12/2014 | Mandai | H04N 1/00411 358/1.15 |
| 2017/0019546 | A1 * | 1/2017 | Tse | G03G 15/5016 |

FOREIGN PATENT DOCUMENTS

| | | |
|---|---|---|
| CN | 105636791 | 6/2016 |
| JP | 5238104 | 9/1993 |
| JP | 7304237 | 11/1995 |
| JP | 2003298791 | 10/2003 |
| RU | 2009100887 | 7/2010 |

* cited by examiner

MODULAR DASHBOARD OF A PRINTING DEVICE WITH CUT-OUTS FOR USER CONTROLS

BACKGROUND

Printing devices are widely used in personal, business and government settings to produce hardcopy documents from digital data. Many printing devices provide multiple functions such as printing, scanning, copying and others. Because of the different settings where printing devices are used, different features and functions may be desired. For example, in some settings a security device may be incorporated with the printing device to control who can access and operate that printing device. In other setting, a lower level, or security or no such security at all, may be needed. Thus, different purchasers may want printing devices with different features and functions.

BRIEF DESCRIPTION OF THE DRAWINGS

The accompanying drawings illustrate various implementations of the principles described herein and are a part of the specification. The illustrated implementations are merely examples and do not limit the scope of the claims.

Throughout the drawings, identical reference numbers designate similar, but not necessarily identical, elements.

DETAILED DESCRIPTION

Figure 1:
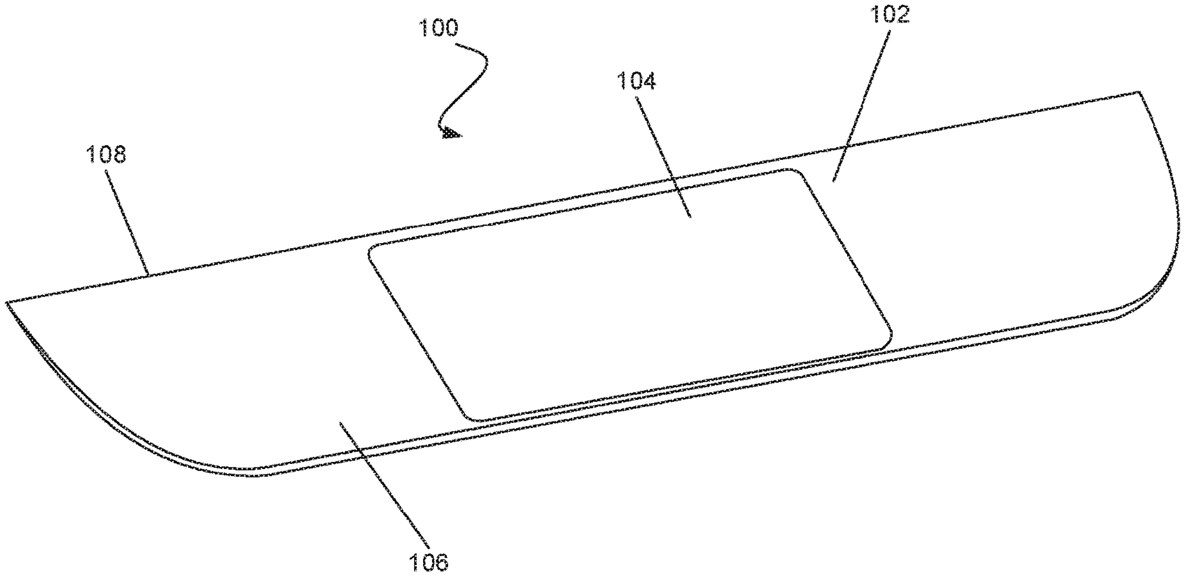
FIG. 1 is an illustration of an example of a modular dashboard for a printing device, consistent with the disclosed implementations.

As indicated above, printing devices are widely used in personal, business and government settings to produce hardcopy documents from digital data. Because of the different settings where printing devices are used, different features and functions may be desired. Consequently, the present describes a modular dashboard for a printing device that promotes the customization of the printing device to have different features and functions based on the needs of a purchaser.

In one example, the present specification describes a modular dashboard for a printing device that includes a board; a cut-out in the board to accommodate user controls; a lateral portion of the board that is lateral to the cut-out to cover a pocket in the printing device for containing a device adding functionality to the printing device; and a fastener for removably attaching the board to the printing device.

In another example, the present specification describes a printing device that includes: a user input device; at least one pocket adjacent the user input device to accommodate a device for adding functionality to the printing device; a dashboard with a cut-out to surround and accommodate the user input device and a portion to cover the at least one pocket; and a receiver for a fastener of the dashboard to removably secure the dashboard to the printing device.

In still another example, the present specification describes a printing device that includes a user input device; at least one pocket adjacent the user input device to accommodate a device for adding functionality to the printing device; a removable dashboard with a cut-out to surround and accommodate the user input device and a portion to cover the at least one pocket; and an additional device on the dashboard to add further functionality to the printing device with a connection to circuitry of the printing device.

As used herein and in the following claims, the term "dashboard" refers to an exterior component on or around which user interface elements, such as displays, input device, controls, etc., are arranged.

As used herein and in the following claims, the term "modular" refers to a self-contained unit, such as a printing device component, that can be readily replaced with a similar unit that may provide different features or functions. In the examples described herein, a printing device dashboard is modular.

As used herein and in the following claims, the term "removably" refers to a connection or attachment that is not permanent and can be readily undone, for example, by un-snapping a snapped-together joint or unscrewing a thumb screw without needing a tool. Connections or attachments that can be made or unmade by hand, without a tool, are removably made. Connections that can be made or unmade easily with a simple tool are also removably made.

As used herein in the following claims, term "cut-out" refers to a hole or void in an otherwise continuous sheet of material. A cut-out may be completely surrounded by the material in which it is made or may be in the edge of a sheet of such material.

As used herein in the following claims, term "security hardware circuit" refers to a hardware device for providing a security feature to a printing device, controlling use of the printing device. For example, a security hardware circuit may include a card reader (both proximity and slide readers), a fingerprint scanner or other biometric scanner, a radio frequency (RF) device (including both Near-Field Communication modules and RF identification (RFID) modules) and others.

FIG. 1 is an illustration of an example of a modular dashboard for a printing device, consistent with the disclosed implementations. As shown in FIG. 1, the dashboard (100) includes a board (102); a cut-out (104) in the board (102) to accommodate user controls on the printing device; a lateral portion (106) of the board (102) that is lateral to the cut-out (104) to cover a pocket in the printing device for containing a device adding functionality to the printing device; and a fastener (108) for removably attaching the board to the printing device.

In some examples, the board (102) is a sheet of transparent material, such as glass or plastic, adhered to a sheet metal layer. The transparent material may be tinted so as to be only partially transparent. As will be described in further detail below, the sheet metal layer may include windows such that the transparency of the transparent material allows the user to see indicators or components placed below the board.

The cut-out (104) provides access through the dashboard (100) to user controls already on the printing device, such as a touch sensitive display. In the illustrated example, the cut-out (104) completely surrounds the user controls. This will be demonstrated further below.

The fastener (108) is generically illustrated in FIG. 1. As indicated this fastener (108) is to removeably attach the dashboard (100) to a supporting printing device. The fastener (108) may be an edge of the board (102) that is snapped into a corresponding receiver of the printing device. In other examples, the fastener (108) may be a thumbscrew that is screwed by hand into a threaded hole of the printing device.

Figure 2:
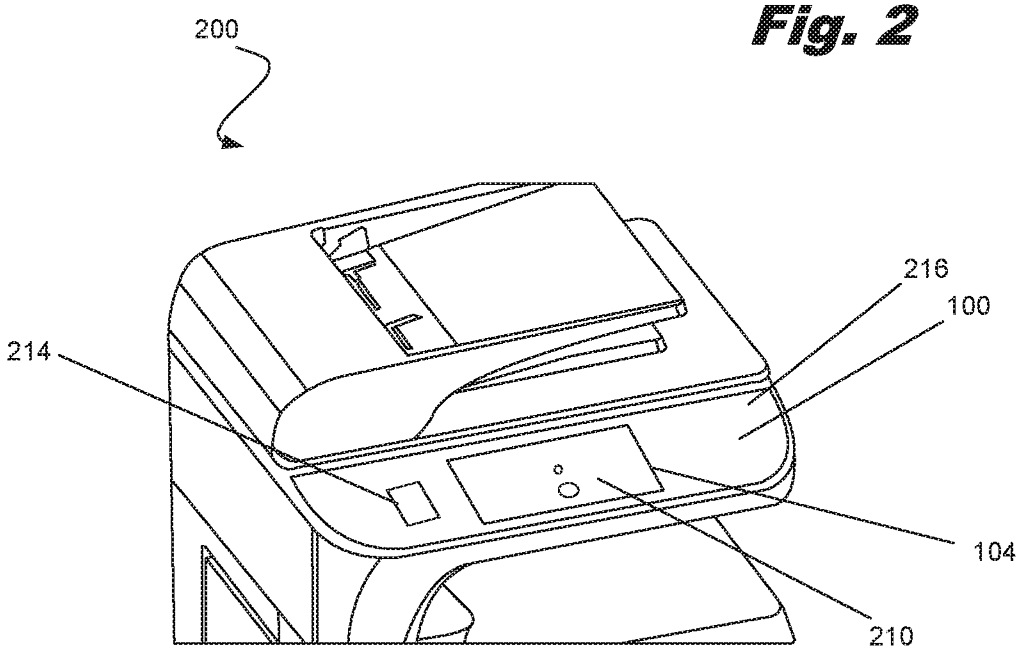
FIG. 2 is an illustration of an example of a printing device incorporating a modular dashboard, consistent with the disclosed implementations.

FIG. 2 is an illustration of an example of a printing device incorporating a modular dashboard, consistent with the disclosed implementations. The illustrated printing device includes a user input device (210); at least one pocket (214) adjacent the user input device to accommodate a device for adding functionality to the printing device; a dashboard (100) with a cut-out (104) to surround and accommodate the user input device (210) and a portion to cover the at least one pocket (214); and a receiver (216) for a fastener of the dashboard (100) to removably secure the dashboard (100) to the printing device (200).

As shown in FIG. 2, the printing device (200) includes a user input panel (210), which may be a touch-sensitive display device. The user input panel (210) is accommodated within the cut-out (104) of, and surrounded completely by, the dashboard (100).

Lateral to the user input panel (210), the printing device (200) includes the pocket (214). This pocket (214) is shown in ghost in FIG. 2 and is covered by the dashboard (100), when installed.

The printing device (200) also includes a receiver, shown generically as (216), for the fastener of the dashboard. As indicated above, this receiver (216) may snap to an edge of the dashboard (100) or may be a threaded hole for receiving a thumbscrew of the dashboard (100). Any other example of a removable connection could be used between the printing device (200) and the dashboard (100).

Figure 3:
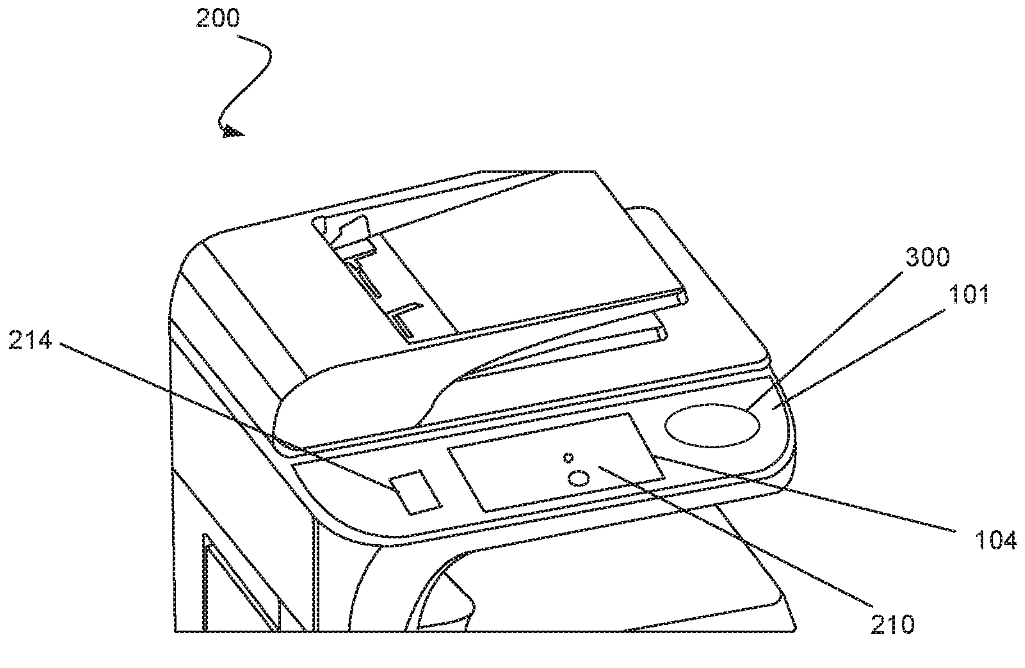
FIG. 3 is an illustration of another example of a printing device incorporating a modular dashboard, consistent with the disclosed implementations.

FIG. 3 is an illustration of another example of a printing device incorporating a modular dashboard, consistent with the disclosed implementations. The example of FIG. 3 is similar to that of FIG. 2, except that the dashboard (101) shown in FIG. 3 includes an additional device (300) that is incorporated into the dashboard to add further functionality to the printing device.

In FIG. 3, the illustrated printing device (200) includes a user input device (210); at least one pocket (214) adjacent the user input device (210) to accommodate a device for adding functionality to the printing device (200); a removable dashboard (101) with a cut-out (104) to surround and accommodate the user input device (210) and a portion to cover the at least one pocket (214); and an additional device (300) on the dashboard (101) to add further functionality to the printing device (200) with a connection to circuitry of the printing device.

Users that desire a basic printing device may prefer the modular dashboard (100) of FIG. 2. However, for users that desire additional features or functionality, the dashboard (101) of FIG. 3 can incorporate any number of different additional devices (300) for provide the desired feature set. The dashboard (101) may include one or more additional devices (300).

For example, the additional device (300) may be an additional user input device, such as a keyboard, for example, a capacitive keyboard. In other examples, the additional device (300) may be a security hardware circuit. This security hardware circuit may be perceived as additionally secure for being integrated into the dashboard. The security hardware circuit may be, for example, a card reader (both proximity and slide readers), a fingerprint scanner or other biometric scanner, a radio frequency (RF) device (including both Near-Field Communication modules and RF identification (RFID) modules) and others.

If the additional device (300) needs the space, the printing device (200) may include an additional pocket located to the right of the user input device (210), as shown in FIG. 3, to accommodate the additional device (300). Examples of this configuration will be provided below.

The dashboard (101) of FIG. 3 also provides for easy upgrade of a basic printing device unit by a distribution center or dealership, or in the field. In any such setting, a more basic dashboard can be swapped out for a dashboard providing the additional functions or features that a user may desire.

Figure 4:
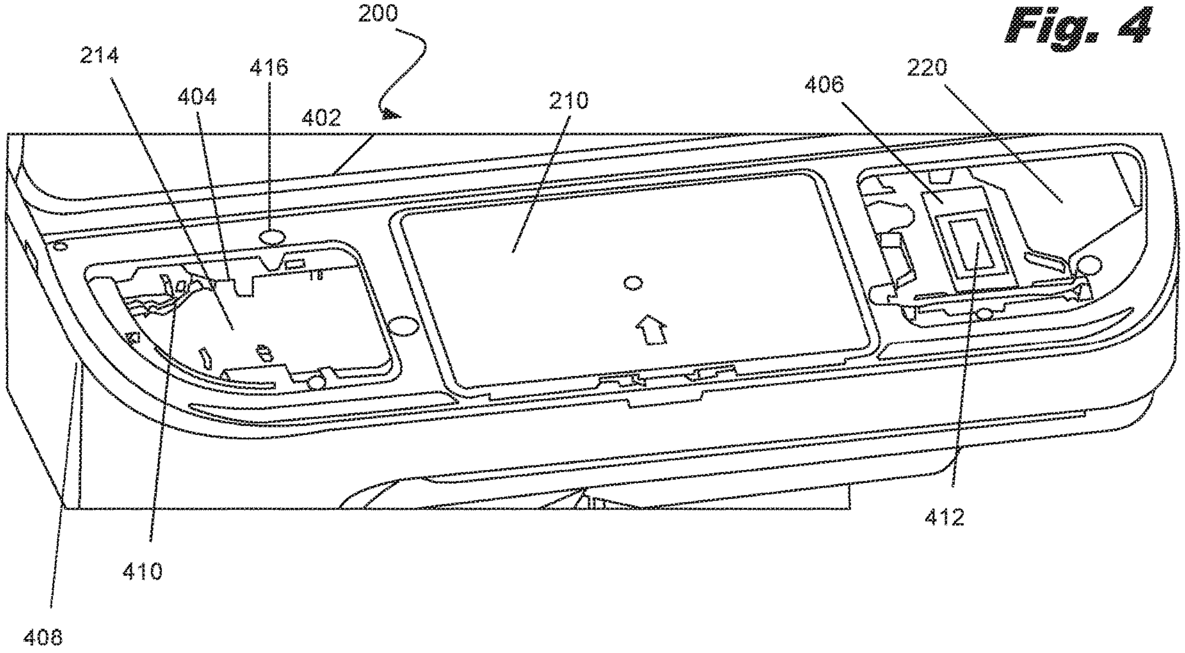
FIG. 4 is an illustration of an example of a printing device with a modular dashboard removed, consistent with the disclosed implementations.

FIG. 4 is an illustration of an example of a printing device with a modular dashboard removed, consistent with the disclosed implementations and further illustrating several of the features discussed above. As shown in FIG. 4, the printing device (200) includes a central user input device (210) which would be surrounded by, and accommodated in, the cut-out of the modular dashboard described above, when that dashboard is installed.

On either side of the user input device (210), the printing device (200) includes a pocket (214, 220). Each pocket is simply a compartment in the printing device providing space for installing additional components. When installed, the dashboard described above covers and closes these pockets.

On the right, the pocket (220) may accommodate a security hardware circuit that is either incorporated into the dashboard or simply disposed in the pocket under the dashboard. In the illustrated example, the right pocket (220) contains a Near-Field Communication (NFC) module (406), which is a specific type of RF receiver used to communicate with mobile devices for authentication purposes. The NFC module (406) also includes a Light Emitting Diode (LED) indicator (412). As noted above, visual signals indicating operation of the NFC module (406) from this indicator (412) may be visible to a user through the dashboard. This would apply similarly to any other visual signaling device on any other component installed in the pockets.

On the left, the pocket (214) may further accommodate any additional devices to augment the printing device. These devices may be either incorporated into the dashboard or simply installed in the pocket (214). Examples, include other security hardware circuits, communication circuits and others.

Visible in the left pocket (214) is a printed circuit assembly (PCA) (402) that is part of the electronics of the printing device (200). In the illustrated example, the PCA (402) includes a number of Universal Serial Bus (USB) connectors (404) that may be used to connect components in either of the pockets (214, 220) to the PCA and the internal electronics of the printing device.

A cable (410) also connects this PCA (402) with a USB port (408) on the side of the printing device (200). This USB port (408) may be used, for example, to connect a USB drive to the printing device (200). Such a memory device may contain a document or other print job to be produced in hardcopy form by the printing device or may otherwise be used to transfer data to or from the printing device (200).

Lastly, a number of threaded holes (216) are illustrated in FIG. 4. These holes (416) are used to receive thumbscrews on a dashboard to removably attach the dashboard to the printing device (200) as described above.

Figure 5:
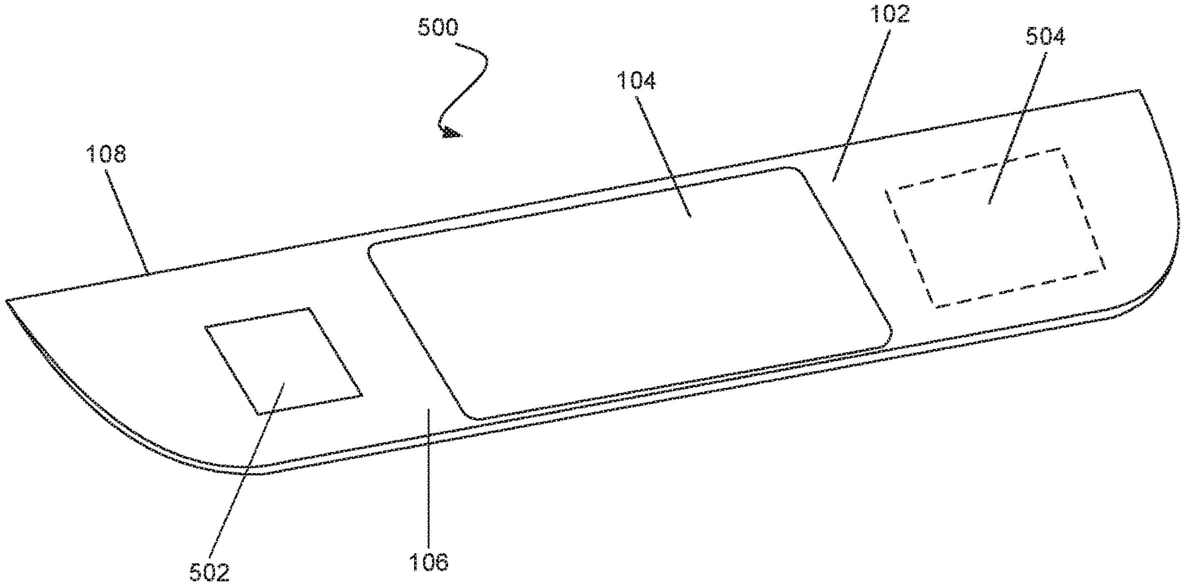
FIG. 5 is an illustration of another example of a modular dashboard, consistent with the disclosed implementations.

FIG. 5 is an illustration of another example of a modular dashboard, consistent with the disclosed implementations. As shown in FIG. 4, the dashboard (500) is similar to the dashboard shown in FIG. 1. However, the dashboard (500) specifically includes a window (504) that is registered with a pocket in the printing device to permit a user to see visual indicators from a component in the pocket, as described above.

Some examples of the dashboard (500) of FIG. 5 may also include an access door (502). This provides faster access to the pocket on the left without removing the dashboard (500).

Figure 6:
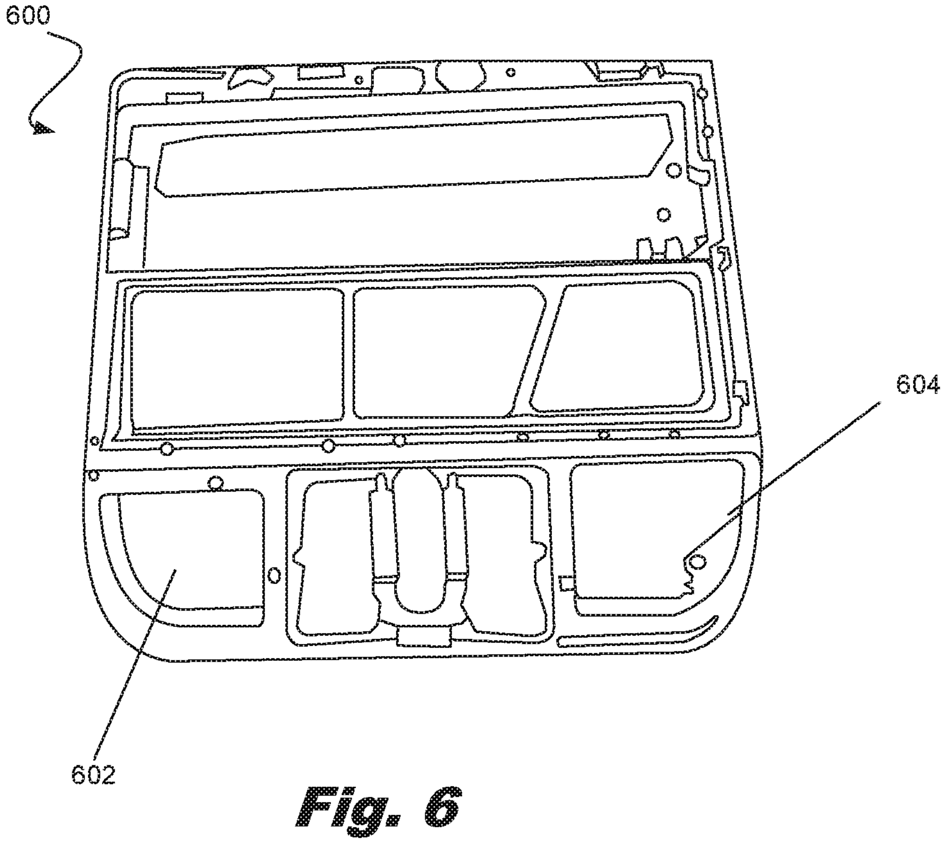
FIG. 6 is an illustration of an example of a metal frame of a printing device for supporting a modular dashboard, consistent with the disclosed implementations.

FIG. 6 is an illustration of an example of a metal frame of a printing device for supporting a modular dashboard, consistent with the disclosed implementations. As shown in FIG. 6, the metal frame (600) includes openings (602, 604) that are registered with the pockets of the printing device described above.

Figure 7:
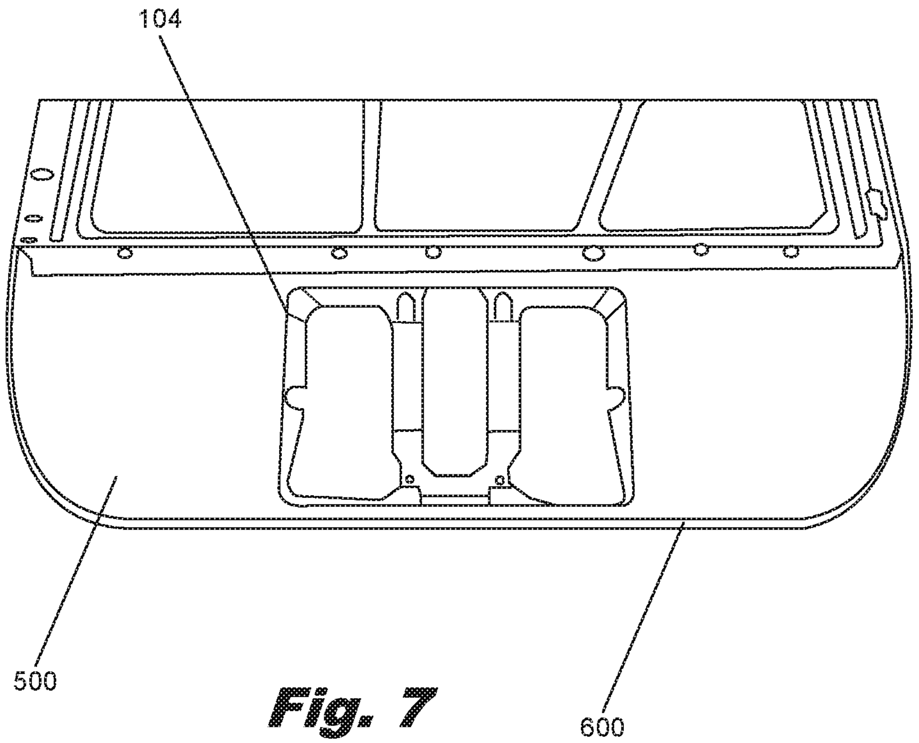
FIG. 7 is an illustration of the metal frame of FIG. 6 with the dashboard of FIG. 5 installed, consistent with the disclosed implementations.

FIG. 7 is an illustration of the metal frame of FIG. 6 with the dashboard of FIG. 5 installed, consistent with the disclosed implementations. As shown in FIG. 7, the dashboard (500) is installed on the metal frame (600). The cut-out (104) of the dashboard (500) provides access to the user input device, described above, which is also supported on the metal frame (600).

Figure 8:
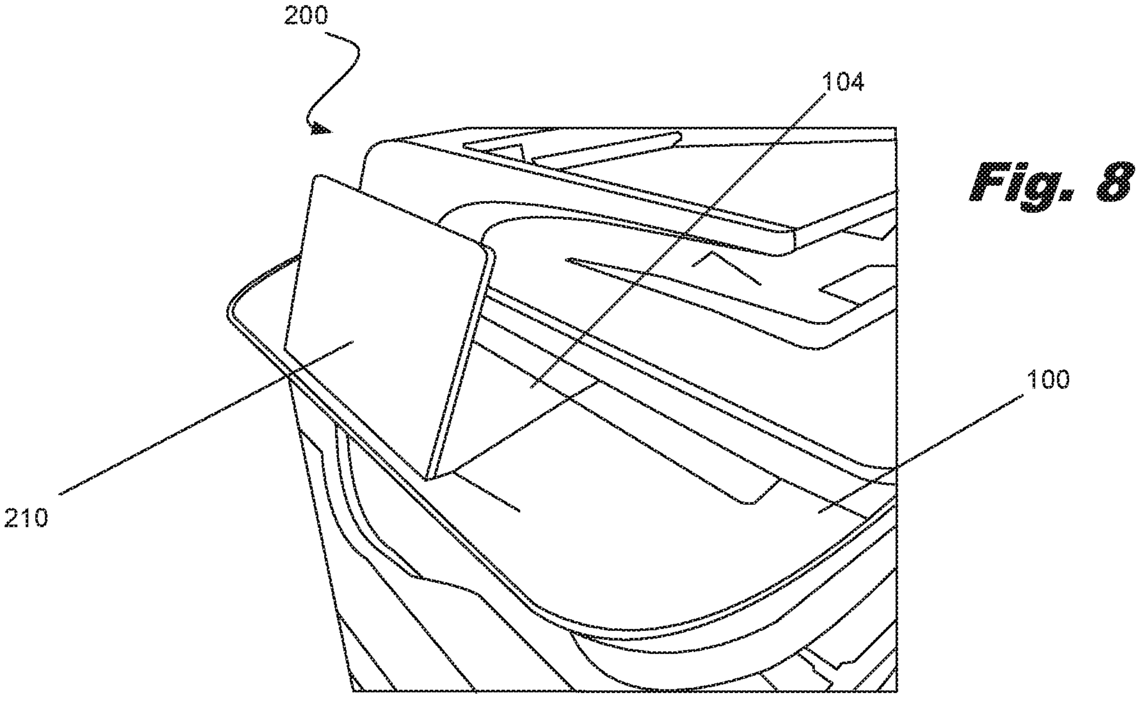
FIG. 8 is an illustration of an example of a printing device incorporating a modular dashboard that is in operation, consistent with the disclosed implementations.

FIG. 8 is an illustration of an example of a printing device incorporating a modular dashboard that is in operation, consistent with the disclosed implementations. As shown in FIG. 8, the printing device (200) includes a dashboard (100), which can be of any of the examples discussed above and other types.

The cut-out (104) again accommodates the user input device (210). As shown in FIG. 8, the user input device (210) may be supported on a hinged support that allows it to fold from a position flush with the dashboard (100) to an inclined position which is shown in FIG. 8.

Figure 9:
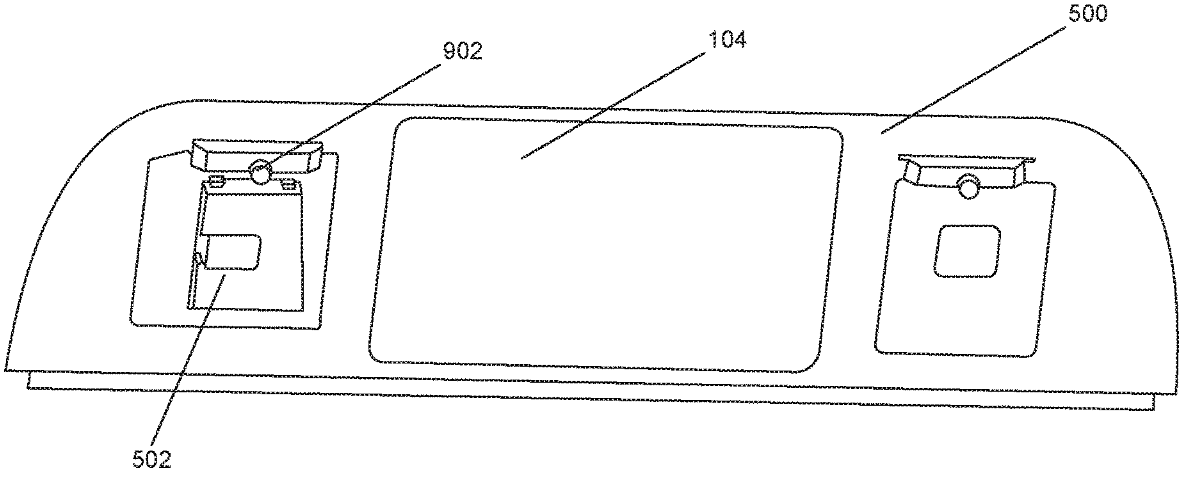
FIG. 9 is an illustration of an example of a rear side of modular dashboard, consistent with the disclosed implementations.

FIG. 9 is an illustration of an example of a rear side of modular dashboard, consistent with the disclosed implementations. As shown in FIG. 9, the dashboard (500) includes the cut-out (104). The dashboard (500) may also include the access door (502) described above. Lastly, one example of the thumbscrews (902) mentioned above is illustrated in FIG. 9.

The preceding description has been presented only to illustrate and describe examples of the principles described. This description is not intended to be exhaustive or to limit these principles to any precise form disclosed. Many modifications and variations are possible in light of the above teaching,

What is claimed is:

1. A modular dashboard of a printing device, the dashboard comprising:
- a board;
- a cut-out in the board to provide access to user controls of the printing device, wherein the cut-out completely surrounds the user controls of the user device;
- a lateral portion of the board that is lateral to the cut-out to cover a pocket in the printing device to contain a device adding functionality to the printing device; and
- a fastener to removably attach the board to the printing device.

2. The modular dashboard of claim 1, wherein the board is a layer of transparent material on a sheet metal frame.

3. The modular dashboard of claim 1, further comprising a window in the sheet metal frame covered by the transparent material to align with the pocket in the printing device.

4. The modular dashboard of claim 1, further comprising a second cut-out to align with, and provide access to, the pocket in the printing device.

5. The modular dashboard of claim 1, wherein the board comprises two lateral portions on either side of the cut-out, each lateral portion to cover a pocket in the printing device for containing a device adding functionality to the printing device.

6. The modular dashboard of claim 4, further comprising an additional user input device on the board with a connector to connect to the circuitry of the printing device.

7. The modular dashboard of claim 6, wherein the additional user input device comprises keyboard.

8. The modular dashboard of claim 4, further comprising a security hardware circuit on the board with a connector for connecting to the circuitry of the printing device.

9. The modular dashboard of claim 8, wherein the security hardware circuit comprises a card reader.

10. The modular dashboard of claim 1, wherein the fastener comprises at least one thumb screw.

11. A printing device comprising:
- a user input device;
- at least one pocket adjacent the user input device to accommodate a device to add functionality to the printing device;
- a dashboard with a cut-out to completely surround and provide access to the user input device and a portion to cover the at least one pocket; and
- a receiver for a fastener of the dashboard to removably secure the dashboard to the printing device.

12. The printing device of claim of claim 11, further comprising a printed circuit assembly (PCA) of the printing device comprising at least one Universal Serial Bus (USB) port accessible from inside the at least one pocket to accommodate a device for adding functionality to the printing device in the pocket.

13. The printing device of claim 11, further comprising a security hardware device for authenticating users of the printing device disposed in the at least one pocket of the printing device.

14. The printing device of claim 11, wherein the user input device is a touch sensitive screen.

15. A printing device comprising:
- a user input device;
- at least one pocket adjacent the user input device to accommodate a device for adding functionality to the printing device;
- a removable dashboard with a cut-out to completely surround and provide access to the user input device and a portion to cover the at least one pocket; and
- an additional device on the dashboard to add further functionality to the printing device with a connection to circuitry of the printing device.

16. The modular dashboard of claim 1, wherein indicators below the board are visible through the lateral portion of the board.

17. The modular dashboard of claim 1, further comprising an access door on the board to provide access to the pocket.

18. The printing device of claim 11, wherein the at least one pocket comprises two pockets, one on each side of the user input device.

19. The printing device of claim 11, further comprising a hinged support supporting the user input device to fold the user input device from a position flush with the dashboard to an inclined position.

20. The printing device of claim 15, further comprising a window on the removable dashboard board registered over the at least one pocket.

* * * * *